United States Patent
Chen et al.

(10) Patent No.: US 10,594,131 B2
(45) Date of Patent: Mar. 17, 2020

(54) POWER SUPPLY GROUNDING FAULT PROTECTION CIRCUIT

(71) Applicant: Ze Chen, Yueqing (CN)

(72) Inventors: Ze Chen, Yueqing (CN); Xincheng Pan, Huizhou (CN); Ye Zhang, Huizhou (CN)

(73) Assignee: Ze Chen, Yeuqing (CN)

( * ) Notice: Subject to any disclaimer, the term of this patent is extended or adjusted under 35 U.S.C. 154(b) by 398 days.

(21) Appl. No.: 15/375,324

(22) Filed: Dec. 12, 2016

(65) Prior Publication Data

US 2017/0170649 A1    Jun. 15, 2017

(30) Foreign Application Priority Data

Dec. 15, 2015    (CN) .......................... 2015 1 0930712

(51) Int. Cl.
*H02H 3/33* (2006.01)

(52) U.S. Cl.
CPC .................................. *H02H 3/334* (2013.01)

(58) Field of Classification Search
CPC ............................. H02H 7/125; H02M 7/217
USPC ......................................................... 361/42
See application file for complete search history.

(56) References Cited

U.S. PATENT DOCUMENTS

| | | | |
|---|---|---|---|
| 3,813,551 A | 5/1974 | Broadbent | |
| 4,001,652 A | 1/1977 | Klein | |
| 4,121,098 A | 10/1978 | Jagoutz | |
| 4,415,806 A | 11/1983 | Tar | |
| 4,901,183 A | 2/1990 | Lee | |
| 5,280,404 A | 1/1994 | Ragsdale | |
| 5,541,800 A | 7/1996 | Misencik | |
| 5,729,145 A | 3/1998 | Blades | |
| 6,828,886 B2 | 12/2004 | Germain | |
| 6,954,125 B2 | 10/2005 | Wu | |
| 7,253,637 B2 | 8/2007 | Dvorak | |
| 7,312,963 B1 | 12/2007 | Radosavljevic | |
| 7,408,432 B2 | 8/2008 | Shi | |
| 7,645,148 B2 | 1/2010 | Carbone | |

(Continued)

FOREIGN PATENT DOCUMENTS

| CN | 2181112 Y | 10/1994 |
|---|---|---|
| CN | 201210024531.5 | 2/2012 |

(Continued)

OTHER PUBLICATIONS

Mar. 15, 2018, Foreign Office Action in related Chinese Patent Application No. 201510930712.8.

(Continued)

*Primary Examiner* — Kevin J Comber
(74) *Attorney, Agent, or Firm* — Mei & Mark LLP

(57) ABSTRACT

The present disclosure relates to a power supply grounding fault protection circuit. A power supply grounding fault protection circuit may include a power supply circuit, a leakage grounding detection circuit, a signal amplifying and shaping circuit, a microcontroller control circuit, a power supply detection and indicator circuit, a tripping mechanism control circuit, a reverse grounding detection and execution circuit, a wireless network circuit, and an automatic resetting circuit. The practice of the present disclosure may permit a user to reset the grounding fault circuit interrupter remotely after a leaking fault of a circuit is eliminated.

20 Claims, 7 Drawing Sheets

(56) References Cited

U.S. PATENT DOCUMENTS

| | | |
|---|---|---|
| 7,889,466 B2 | 2/2011 | Chan |
| 7,936,238 B1 | 5/2011 | Weeks |
| 8,335,062 B2 | 12/2012 | Haines |
| 8,462,006 B2 | 6/2013 | Chen |
| 8,599,523 B1 | 12/2013 | Ostrovsky |
| 8,779,875 B2 | 7/2014 | Chen |
| 8,847,712 B2 | 9/2014 | Chen |
| 8,861,146 B2 | 10/2014 | McMahon |
| 9,601,289 B2 | 3/2017 | Pan |
| D856,935 S | 8/2019 | Pan |
| 2003/0102944 A1 | 6/2003 | Leopold |
| 2004/0066593 A1 | 4/2004 | Kolker |
| 2004/0070474 A1 | 4/2004 | Wu |
| 2004/0169590 A1 | 9/2004 | Haughawout |
| 2005/0063109 A1 | 3/2005 | Baldwin |
| 2005/0264962 A1 | 12/2005 | Kim |
| 2006/0081781 A1 | 4/2006 | Bluzer |
| 2006/0114627 A1 | 6/2006 | Wong |
| 2006/0279886 A1 | 12/2006 | Huang |
| 2007/0030608 A1 | 2/2007 | Baldwin |
| 2007/0279814 A1 | 12/2007 | Bonilla |
| 2008/0002314 A1 | 1/2008 | Batko |
| 2008/0129307 A1 | 6/2008 | Yu |
| 2009/0086390 A1 | 4/2009 | Huang |
| 2009/0161271 A1 | 6/2009 | Huang |
| 2010/0025934 A1 | 2/2010 | Hassman |
| 2010/0060469 A1 | 3/2010 | Hetzmannseder |
| 2010/0254049 A1 | 10/2010 | Yue |
| 2010/0259347 A1 | 10/2010 | Ziegler |
| 2010/0324747 A1 | 12/2010 | Lee |
| 2011/0046792 A1 | 2/2011 | Imes |
| 2011/0063126 A1 | 3/2011 | Kennedy |
| 2011/0104918 A1 | 5/2011 | Chen |
| 2011/0216452 A1* | 9/2011 | Haines ................. H02H 3/00 361/42 |
| 2013/0021120 A1 | 1/2013 | Chen |
| 2013/0038968 A1* | 2/2013 | Chen ................. H01H 83/04 361/42 |
| 2013/0241678 A1 | 9/2013 | Bonasia |
| 2014/0098446 A1 | 4/2014 | Aromin |
| 2014/0268437 A1 | 9/2014 | Simonin |
| 2014/0285939 A1 | 9/2014 | Chen |
| 2016/0156225 A1 | 6/2016 | Yang |
| 2016/0172839 A1 | 6/2016 | Pan |
| 2016/0294179 A1 | 10/2016 | Kennedy |
| 2016/0365720 A1 | 12/2016 | Pan |
| 2017/0033602 A1 | 2/2017 | Zhang |
| 2017/0047726 A1 | 2/2017 | Pan |
| 2017/0148529 A1 | 5/2017 | Pan |
| 2017/0170649 A1 | 6/2017 | Chen |
| 2018/0083434 A1 | 3/2018 | Lim |
| 2018/0083436 A1 | 3/2018 | Chen |
| 2018/0191150 A1 | 7/2018 | Chen |
| 2019/0074150 A1 | 3/2019 | Chen |

FOREIGN PATENT DOCUMENTS

| | | |
|---|---|---|
| CN | 104332946 A | 2/2015 |
| CN | 204290310 U | 4/2015 |
| CN | 204651264 U | 9/2015 |
| CN | 105137783 A | 12/2015 |
| CN | 104332946 B | 5/2017 |

OTHER PUBLICATIONS

Sep. 18, 2018, Foreign Office Action in related Chinese Patent Application No. 201510930712.8.

* cited by examiner

POWER SUPPLY GROUNDING FAULT PROTECTION CIRCUIT

CROSS-REFERENCE TO RELATED APPLICATION

This application claims priority to and incorporates herein by reference in its entirety Chinese Application No. 201510930712.8, filed on Dec. 15, 2015.

TECHNICAL FIELD

The present disclosure relates to a power supply grounding fault protection circuit.

BACKGROUND

The ground fault circuit interrupter (GFCI) is a leakage protection product widely used in countries/regions such as the United States, Canada, North America, and South America. A GFCI may provide power to loads through jacks in its upper cover; it may power the loads through a delivery connection assembly, while reducing electrical safety risks.

Chinese Patent Application No. CN104332946A, published on Feb. 4, 2015, and incorporated herein by reference in its entirety, discloses a "power supply grounding fault protection circuit and grounding fault circuit interrupter." The power supply grounding fault protection circuit comprises a power supply circuit, a leakage grounding detection circuit, a signal amplifying and shaping circuit, a microcontroller control circuit, a power supply detection and indicator circuit, a tripping mechanism control circuit, and a reverse connection detection and execution circuit. To implement leakage protection for the power supply, the electromagnetic tripping mechanism is configured to act responsively to the leakage grounding detection circuit.

The above-described power supply grounding fault protection circuit, through providing a reverse connection detection and execution circuit and a simulation leakage circuit, reduces safety risks that may be caused by, for example, incorrect GFCI installation. It may also provide an automatic leakage detection function during operation. In a working state, when the grounding fault circuit interrupter fails, for example due to current leakage, a user may be warned of the failure so that the device may be timely replaced. This may prevent circuit safety risks caused by delayed observance of GFCI failure, and thus significantly improves safety protection function of the GFCI.

Nevertheless, the existing power supply grounding fault protection circuit has the following drawbacks: When a GFCI has been tripped and after the leakage fault of the circuit is eliminated, the GFCI must be manually reset to resume operation. Thus, when an operator is away from the GFCI and is not able to manually reset the GFCI, it may be difficult to place the GFCI back into its normal working state.

SUMMARY

A technical problem to be solved by the present disclosure is to provide a power supply grounding fault protection circuit that overcomes the drawbacks of the existing grounding fault protection circuits that require resetting be done manually and that do not provide remote resetting capabilities.

In one example, a power supply grounding fault protection circuit is provided. It may include a power supply circuit, a leakage grounding detection circuit, a signal amplifying and shaping circuit, a microcontroller control circuit, a power supply detection and indicator circuit, a tripping mechanism control circuit, a reverse grounding detection and execution circuit, a wireless network circuit, and an automatic resetting circuit.

In another example, the leakage grounding detection circuit includes a leakage detection circuit and a grounding detection circuit, which may detect leakage failure and grounding failure, respectively. The signal amplifying and shaping circuit may include a leakage detection signal amplifying circuit and a signal shaping circuit, which may be connected to each other and may carry out amplifying and shaping on a leakage detection signal. The microcontroller control circuit may carry out power-on self-test and reset for the power supply grounding fault protection circuit. The power supply detection and indicator circuit may include a power supply detection circuit and an indicator circuit, which may be connected to each other and carry out detection and displaying of a power status. The tripping mechanism control circuit may include a reset switch, which may be provided on a live line and a neutral line of the ground fault protection circuit, and a control circuit that may control the reset switch. The reverse grounding detection and execution circuit may include a reverse connection detection control circuit and a detection and execution circuit, which may be connected to each other and may carry out detecting of a reverse connection of the ground fault protection circuit in a reset state and in a tripped state. The wireless network circuit may carry out sending and receiving of wireless signals of the power supply grounding fault protection circuit and may be respectively connected to the power supply circuit and the microcontroller control circuit. The automatic resetting circuit may be connected to the microcontroller control circuit and may carry out controlling and driving of resetting actions of the reset switch of the tripping mechanism control circuit.

In yet another example, the power supply circuit may include a power supply filter circuit, a first rectifier circuit, a first filter and regulator circuit, and a second filter and regulator circuit. The first filter and regulator circuit may be connected to the leakage grounding detection circuit. The second filter and regulator circuit may be connected to the signal amplifying and shaping circuit and the microcontroller control circuit. The leakage grounding detection circuit, the signal amplifying and shaping circuit, and the microcontroller control circuit may be connected in sequence. The microcontroller control circuit may be connected to the power supply detection and indicator circuit, the tripping mechanism control circuit, and the reverse connection detection and execution circuit.

In yet another example, the power supply filter circuit may be connected to an input terminal of the live line. A first input terminal and a second input terminal of the first rectifier circuit may be respectively connected to an input terminal of the neutral line and an output terminal of the power supply filter circuit. A first pin of the first rectifier circuit may be grounded. A second pin of the first rectifier circuit may connected to the both the first filter and regulator circuit and the second filter and regulator circuit. The reset switch may be positioned on the live line and the neutral line after the grounding detection circuit.

In yet another example, the microcontroller control circuit may include a microcontroller, a first capacitor, and a reset filter circuit. The reset filter circuit may include a reset IC and a second capacitor. A first pin of the reset IC may be connected to a VCC of the ground fault protection circuit, a second pin of the reset IC may be connected to a reset terminal of the microcontroller, and a third pin of the reset IC may be grounded. The second capacitor may be connected between the second and third pins of the reset IC. The first capacitor may be connected between a power supply terminal of the microcontroller and a ground. The power supply terminal of the microcontroller may be connected to the VCC. A ground terminal of the microcontroller may be grounded.

The leakage detection signal amplifying circuit may include a leakage signal processing IC, a third capacitor, a first resistor, and a fourth capacitor. The first resistor and the fourth capacitor may be connected in series between the leakage detection circuit and the grounding detection circuit. The first resistor may be connected between a first pin and a second pin of the leakage signal processing IC.

The signal shaping circuit may include an operation amplifier, a fifth capacitor, a sixth capacitor, a seventh capacitor, a second resistor, a third resistor, a fourth resistor, an eighth capacitor, a ninth capacitor, a tenth capacitor, and a fifth resistor. The fifth, sixth and seventh capacitors may be connected in parallel between the ground and a third pin of the leakage signal processing IC. The second resistor may be connected between a fourth pin of the leakage signal processing IC and a first pin of the operation amplifier. The third and fourth resistors may be connected in series between the VCC and the ground. A connection point of the third and fourth resistors may be connected to a second pin of the operation amplifier. The eighth capacitor may be connected between ground and the first pin of the operation amplifier. A power supply terminal and a ground terminal of the operation amplifier may be respectively connected to the VCC and the ground. The ninth capacitor may be connected between the power supply terminal of the operation amplifier and the ground. The fifth resistor and the tenth capacitor may be disposed in series between the VCC and the ground. A connection point of the fifth resistor and the tenth capacitor may be connected to a third pin of the operation amplifier. The third pin of the operation amplifier may be connected to a control signal input terminal of the microcontroller.

In yet another example, the signal shaping circuit, the leakage signal processing IC, and the microcontroller of the microcontroller circuit may be contained within a single microcontroller control signal amplifying and shaping circuit chip.

In yet another example, the power supply filter circuit may include an inductor coil. The first filter and regulator circuit may include a sixth resistor, an eleventh capacitor, and an internal regulator circuit of a first pin of a leakage signal processing IC. The inductor coil may be connected between the input terminal of the live line and the second input terminal of the first rectifier circuit. The sixth resistor may be connected between the second pin of the first rectifier circuit and the fifth pin of the leakage signal processing IC. The eleventh capacitor may be connected between the fifth pin of the leakage signal processing IC and the ground.

The second filter and regulator circuit may include a seventh resistor, a stabilivolt, a twelfth capacitor, a thirteenth capacitor, a fourteenth capacitor, a fifteenth capacitor, a power supply IC, an sixteenth capacitor, a seventeenth capacitor, a eighteenth capacitor, and a nineteenth capacitor. The seventh resistor may be connected between the second pin of the first rectifier circuit and a first pin of the power supply IC. A positive electrode of the stabilivolt may be grounded. A negative electrode of the stabilivolt may be connected to first pin of the power supply IC. The thirteenth, fourteenth, and fifteenth capacitors may be connected in parallel between the first pin of power supply IC and the ground. The sixteenth, seventeenth, eighteenth, and nineteenth capacitors may be connected in parallel between a second pin of the power supply IC and the ground. The second pin of the power supply IC may be connected to the VCC. A third pin of the power supply IC may be grounded.

The leakage detection circuit may include a first current coupling induction coil and a twentieth capacitor. The twentieth capacitor may be connected between a first terminal and a second terminal of the first current coupling induction coil. The first and second terminals of the first current coupling induction coil may be connected to a sixth and a seventh pin of the leakage signal processing IC, respectively. The live and neutral lines may pass through the first current coupling induction coil.

The grounding detection circuit may include a second current coupling induction coil and a twenty-first capacitor. The twenty first capacitor may be connected to a first terminal and a second terminal of the second current coupling induction coil. The first and second terminals of the second current coupling induction coil may be grounded and connected, respectively, via the fourth capacitor to the second pin of leakage signal processing IC, respectively. The live and neutral lines may pass through the second current coupling induction coil.

The power supply detection circuit may include the first rectifier circuit, the sixth resistor, the internal regulator circuit, the eleventh capacitor, an eighth resistor, a ninth resistor, a twenty-second capacitor, and the microcontroller. The sixth resistor may be connected between the second pin of the first rectifier circuit and the fifth pin of the leakage signal processing IC. The third capacitor may be connected between the fifth pin of the leakage signal processing IC and the ground. The eighth resistor may be connected between the fifth pin of the leakage signal processing IC and the ninth resistor, which may be grounded. A connection point of the eighth and ninth resistors may be connected to a detection terminal of the microcontroller. The twenty-second capacitor may be connected between the ground and the detection terminal of the microcontroller.

The indicator circuit may include a normal signal output terminal and a fault signal output terminal of the microcontroller, a tenth resistor, an eleventh resistor, a red LED, and a green LED. The tenth resistor may be connected between the fault signal output terminal of the microcontroller and a negative electrode of the red LED. The eleventh resistor may be connected between the normal signal output terminal of the microcontroller and a negative electrode of the green LED. A positive electrode of the red LED and a positive electrode of the green LED may be connected to the VCC.

The control circuit of the tripping mechanism control circuit may include the microcontroller, a twenty-third capacitor, a twelfth resistor, a first one-way silicon controlled rectifier, a twenty-fourth capacitor, a thirteenth resistor, and a relay that may interface with the inductor coil. The twenty-third capacitor may be connected between a triggering signal terminal of the microcontroller and the ground. The twelfth resistor may be connected between the triggering signal terminal of the microcontroller and a control electrode of the first one-way silicon controlled rectifier. An anode of the first one-way silicon controlled rectifier may be connected to a connection point where the inductor coil may be connected to the second input terminal of the first rectifier circuit. A cathode of the first one-way silicon controlled rectifier may be grounded. The twenty-fourth capacitor and the thirteenth resistor may be connected in series between the anode of the first one-way silicon controlled rectifier and the ground. The relay may drive the reset switch through a mechanical link.

The reverse connection detection control circuit may include the microcontroller, a twenty-fifth capacitor, a fourteenth resistor, a heavy and light current isolation optocoupler, a fifteenth resistor, a sixteenth resistor, and a two-way silicon controlled rectifier. The twenty-fifth capacitor may be connected between an SCR triggering terminal of the microcontroller and the ground. The fourteenth resistor may be connected between the SCR triggering terminal of the microcontroller and a triggering control terminal of the heavy and light current isolation optocoupler. A power supply terminal of the heavy and light current isolation optocoupler may be connected to the VCC. The fifteenth resistor may be connected between a second T2 electrode of the two-way silicon controlled rectifier and a load output terminal of the live line. The sixteenth resistor may be connected between a control electrode and a first T2 electrode of the two-way silicon controlled rectifier. The control electrode of the two-way silicon controlled rectifier may be connected to a second output terminal of the heavy and light current isolation optocoupler. A first output terminal of the heavy and light current isolation optocoupler may be connected to the load output terminal of the live line.

The detection and execution circuit may include a twenty-sixth capacitor, a twenty-seventh capacitor, a normally-closed contact, a normally-open contact, a seventeenth resistor, a normally-closed switch, and a reverse relay. The twenty-sixth capacitor and the twenty-seventh capacitor may be connected in series. The first output terminal of the heavy and light current isolation optocoupler may be connected to a first terminal of the twenty-seventh capacitor, a first terminal of the normally-closed contact, and a first terminal of the normally-open contact. The second output terminal of the heavy and light current isolation optocoupler may be connected to the twenty-sixth capacitor, a second terminal of the normally-open contact, and a second terminal of the normally-closed contact through the sixteenth resistor. The seventeenth resistor may be connected between a connection point between the twenty-sixth and twenty-seventh capacitors and a load output terminal of the neutral line. The normally-closed switch may be provided on the live and neutral lines between the load output terminals of the live and neutral lines and the reset switch. The normally-closed switch may be linked with the normally-open contact. A first terminal of the reverse relay may be connected to the second output terminal of the heavy and light current isolation optocoupler via the sixteenth resistor. A first terminal of the reverse relay may be connected to the load output terminal of the neutral line. The reverse relay may drive the normally-closed switch through a mechanical link.

In yet another example, the wireless network circuit may include a wireless network IC, a WIFI reset switch, a first wireless reset resistor, a second wireless reset resistor, a wireless reset filter resistor, a wireless reset filter capacitor, and a wireless enabling resistor. The wireless network IC may have WIFI functionality. The wireless reset filter resistor may be connected between ground and a first pin of the wireless network IC. The wireless reset filter capacitor may be connected between ground and a second pin of the wireless network IC. The first wireless reset resistor may be connected between a VCC of the ground fault protection circuit and the second pin of the wireless network IC. The wireless enabling resistor may be connected between the VCC and a third pin of the wireless network IC. The second wireless reset resistor may connected between the VCC and a fourth pin of the wireless network IC. The WIFI reset switch may be connected between the ground and the fourth pin of the wireless network IC. A fifth pin of the wireless network IC may be connected to first pin of a microcontroller of the microcontroller control circuit. A sixth pin of the wireless network IC may be connected to second pin of the microcontroller. The fourth pin of the wireless network IC may be connected to third pin of the microcontroller. The second pin of the wireless network IC may be connected to a fourth pin of the microcontroller.

In yet another example, the automatic resetting circuit may include an automatic resetting iron core, a surge absorption filter capacitor, a surge absorption resistor, and an automatic resetting driving circuit. The automatic resetting driving circuit may include a silicon controlled rectifier and a driving resistor. A first terminal of the automatic resetting iron core may be connected to an input terminal of a live line of the power supply grounding fault protection circuit, and a second terminal of the automatic resetting iron core may be connected to a first pin of the silicon controlled rectifier through the surge absorption filter capacitor and the surge adsorption resistor, which may be connected in series. A second pin of the silicon controlled rectifier may be connected to the automatic resetting iron core. The first pin of the silicon controlled rectifier five may be grounded. The driving resistor may be connected to a fifth pin of a microcontroller of the microcontroller control circuit and a third pin of the silicon controlled rectifier. The fifth pin of the microcontroller may be grounded via a filter capacitor. The microcontroller control circuit may be configured to carry out automatic resetting by receiving wireless control signals through the wireless network circuit and by controlling the resetting iron core through the automatic resetting circuit.

In yet another example, the power supply grounding fault protection circuit may further include a simulation leakage circuit connected to the microcontroller control circuit and the leakage grounding detection circuit.

In yet another example, the simulation leakage circuit may include the microcontroller, a twenty-eighth capacitor, an eighteenth resistor, a second one-way silicon controlled rectifier, and a nineteenth resistor. The twenty-eighth capacitor may be connected between ground and a simulation signal triggering terminal of the microcontroller. The eighteenth resistor may be connected between the simulation signal triggering terminal of the microcontroller and a control electrode of the second one-way silicon controlled rectifier. The second one-way silicon controlled rectifier and the nineteenth resistor may be connected in series between the live line and the ground. The nineteenth resistor may be connected between an anode of the second one-way silicon controlled rectifier and the live line next to the reset switch.

Compared with the prior art, the disclosed power supply grounding fault protection circuit may have the following beneficial effects:

First, providing a wireless network circuit and an automatic resetting circuit enables remote control of the GFCI. That is, a user may remotely receive the working status of the GFCI. And when a leaking fault of a circuit is eliminated, the user may reset the grounding fault circuit interrupter remotely.

Second, it is possible to remind the user of and to display the working status of the GFCI, thereby improving electricity safety for in various environments, including for families.

Third, the circuit is simple and easy to implement.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated into and constitute a part of this specification, illustrate embodiments of the present disclosure and together with the description, serve to explain the principles of the disclosure.

DETAILED DESCRIPTION

References will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Figures 4, 5:
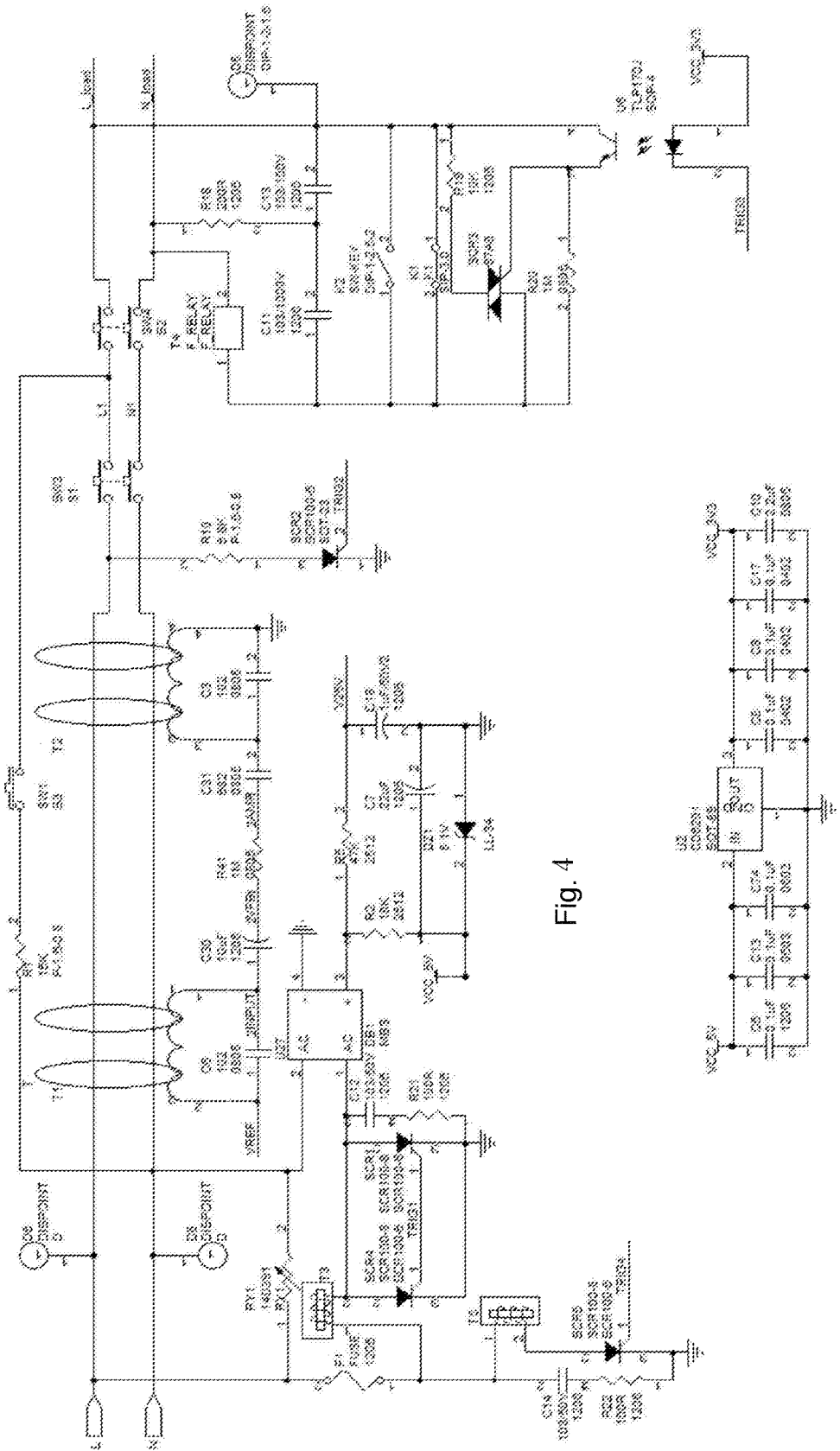
FIG. 4 is a first circuit diagram of a portion of an embodiment of a ground fault protection circuit of the present disclosure.
FIG. 5 is a second circuit diagram of a portion of an embodiment of a ground fault protection circuit of FIG. 4.

In the specification, the circuit symbols in the drawings are named according to the following convention: "circuit symbol_drawing number." For example, a rectifier circuit U27 in FIG. 4 is named U27_4.

Figure 1:
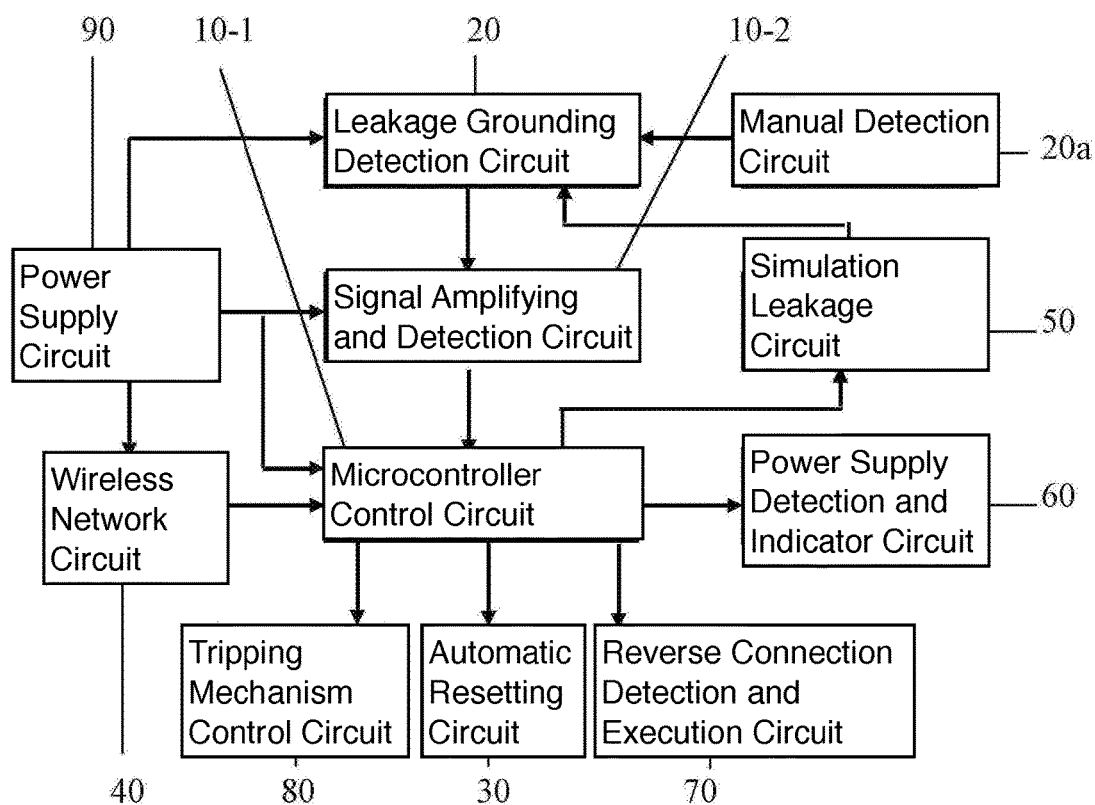
FIG. 1 is a block diagram of an embodiment of a power supply grounding fault protection circuit of the present disclosure.

As shown in FIG. 1, the power supply grounding fault protection circuit of the present disclosure may comprise a power supply circuit 90, a leakage grounding detection circuit 20, a signal amplifying and shaping circuit 10-2, a microcontroller control circuit 10-1, a power supply detection and indicator circuit 60, a tripping mechanism control circuit 80, a manual detection circuit 20a, a simulation leakage circuit 50, a reverse connection detection and execution circuit 70, a wireless network circuit 40, and an automatic resetting circuit 30.

The leakage grounding detection circuit 20 may comprise a leakage detection circuit and a grounding detection circuit, which detect leakage failure and grounding failure, respectively.

The signal amplifying and shaping circuit 10-2 may comprise a leakage detection signal amplifying circuit and a signal shaping circuit, which may be connected to each other and carry out amplifying and shaping on a leakage detection signal.

The microcontroller control circuit may carry out power-on self-test and resetting for the power supply grounding fault protection circuit.

The power supply detection and indicator circuit 60 may comprise a power supply detection circuit and an indicator circuit, which may be connected to each other and carry out detection and displaying of the power supply status.

The tripping mechanism control circuit 80 may comprise comprises a reset switch provided on the live line L and the neutral line N of the power supply grounding fault protection circuit and its control circuit. The position where the reset switch is provided on the live line L and the neutral line N of the power supply grounding fault protection circuit may be located after the grounding detection circuit. The control circuit may carry out controlling of the reset switch.

The reverse connection detection and execution circuit 70 may comprise a reverse connection detection control circuit and a detection and execution circuit, which may be connected to each other and carry out reverse connection detection when the power supply grounding fault protection circuit is in a reset state or a tripped state.

The wireless network circuit 40 may be respectively connected to the power supply circuit 90 and the microcontroller control circuit 10-1, to carry out sending and receiving of wireless signals of the power supply grounding fault protection circuit.

The automatic resetting circuit 30 may be connected to the microcontroller control circuit 10-1 and may carry out controlling and driving of resetting actions of the reset switch of the tripping mechanism control circuit.

The power supply circuit 90 may comprise a power supply filter circuit, a rectifier circuit U27_4, a first filter and regulator circuit, and a second filter and regulator circuit. The power supply filter circuit may be connected to an input terminal of live line L receiving municipal electricity. The input terminals of the rectifier circuit U27_4 may be respectively connected to an input terminal of the neutral line receiving municipal electricity and an output terminal of the filter circuit A. The output terminal pin 4 of the rectifier circuit U27_4 may be grounded, and its output terminal pin 3 may be connected to the first filter and regulator circuit and the second filter and regulator circuit, respectively.

The first filter and regulator circuit of the power supply circuit 90 may be connected to the leakage grounding detection circuit 20. The second filter and regulator circuit of the power supply circuit 90 may be connected to the signal amplifying and shaping circuit 10-2, the microcontroller control circuit 10-1, and the wireless network circuit 40. The leakage grounding detection circuit 20, the signal amplifying and shaping circuit 10-2, and the microcontroller control circuit 10-1 may be connected in sequence. The manual detection circuit 40 may be connected to the leakage grounding detection circuit 20. The microcontroller control circuit 10-1 may be respectively connected to the simulation leakage circuit 50, the power supply detection and indicator circuit 60, the tripping mechanism control circuit 80, and the reverse connection detection and execution circuit 70. The simulation leakage circuit 50 may be connected to the leakage grounding detection circuit 20. The manual detection circuit 20a may be connected to the leakage grounding detection circuit 20.

FIGS. 4 to 8 depict an embodiment of the present disclosure.

Figure 6:
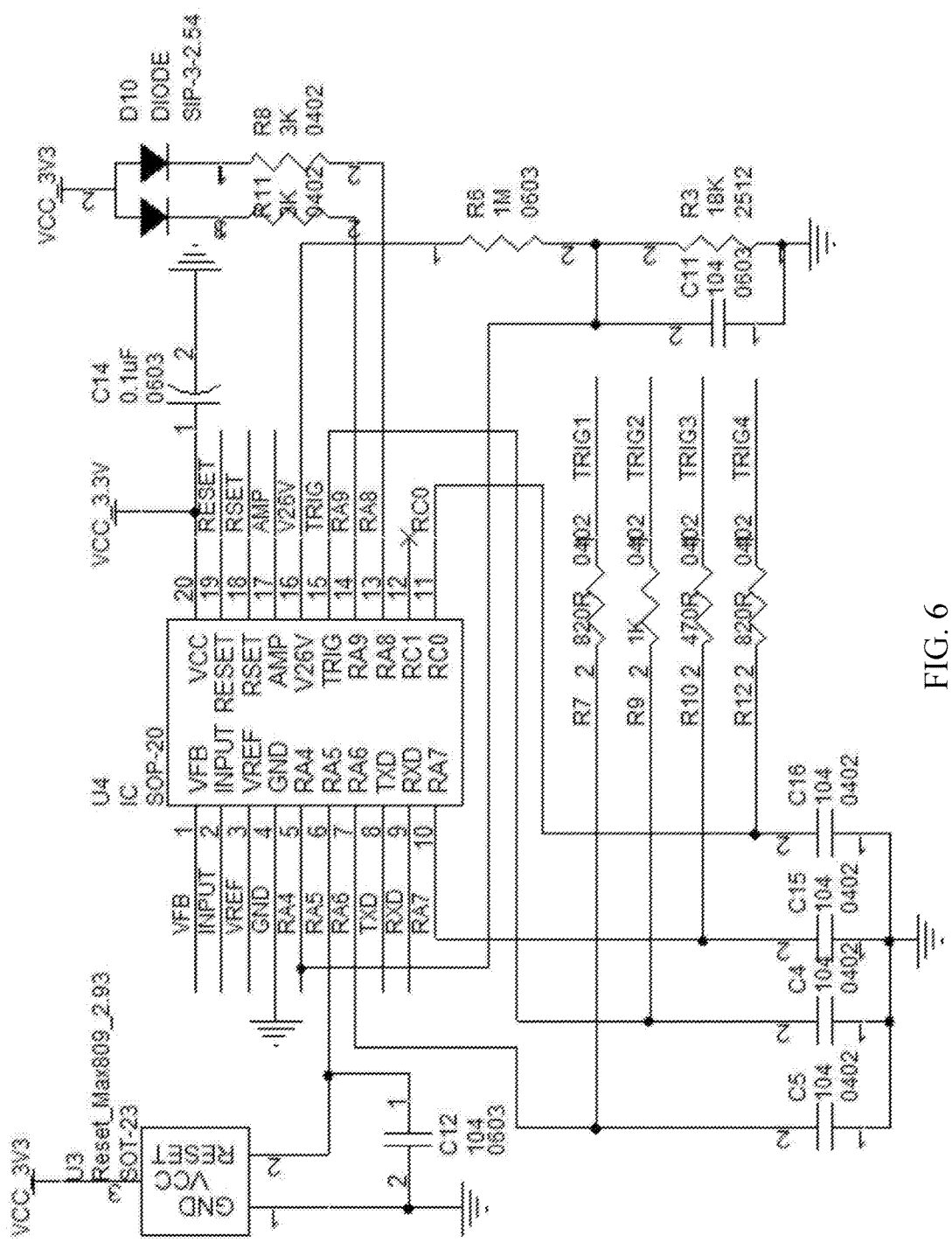
FIG. 6 is a third circuit diagram of a portion of an embodiment of a ground fault protection circuit of FIG. 4.
Figure 8:
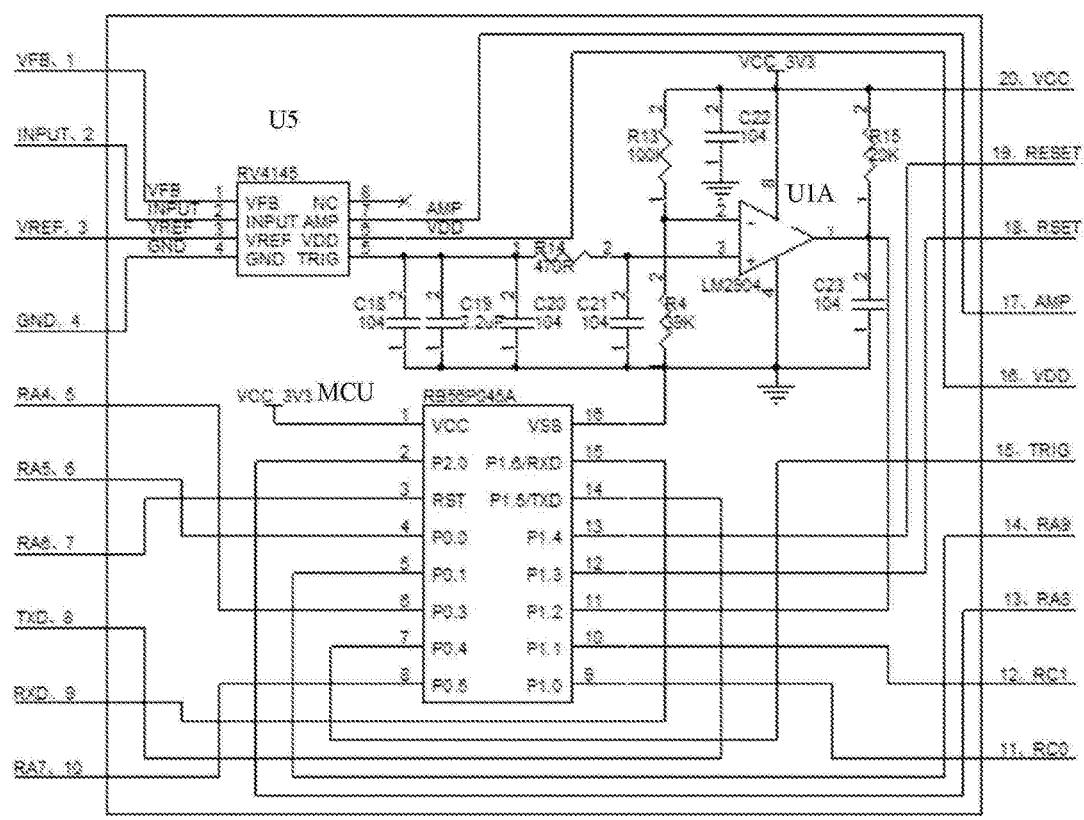
FIG. 8 is a fifth circuit diagram of a portion of an embodiment of a ground fault protection circuit of FIG. 4.

As shown in FIGS. 6 and 8, the microcontroller control circuit 10-1 may comprise a microcontroller MCU_8, a filter capacitor C14_6, and a reset filter circuit. The reset filter circuit comprises a reset IC U3_6, and a filter capacitor C12_6.

The leakage detection signal amplifying circuit of the signal amplifying and shaping circuit 10-2 may comprise a leakage signal processing IC U5_8, a coupling capacitor C30_4, a negative feedback resistor R41_4, and a coupling capacitor C31_4.

The signal shaping circuit of the signal amplifying and shaping circuit 10-2 may comprise a operation amplifier U1A_8, a filter capacitor C18_8, a filter capacitor C19_8, a filter capacitor C20_8, a current limiting resistor R14_8, a filter capacitor C21_8, a voltage divider resistor R13_8, a voltage divider resistor R4_8, a filter capacitor C22_8, a filter capacitor C23_8, and a voltage divider resistor R15_8.

Figure 2:
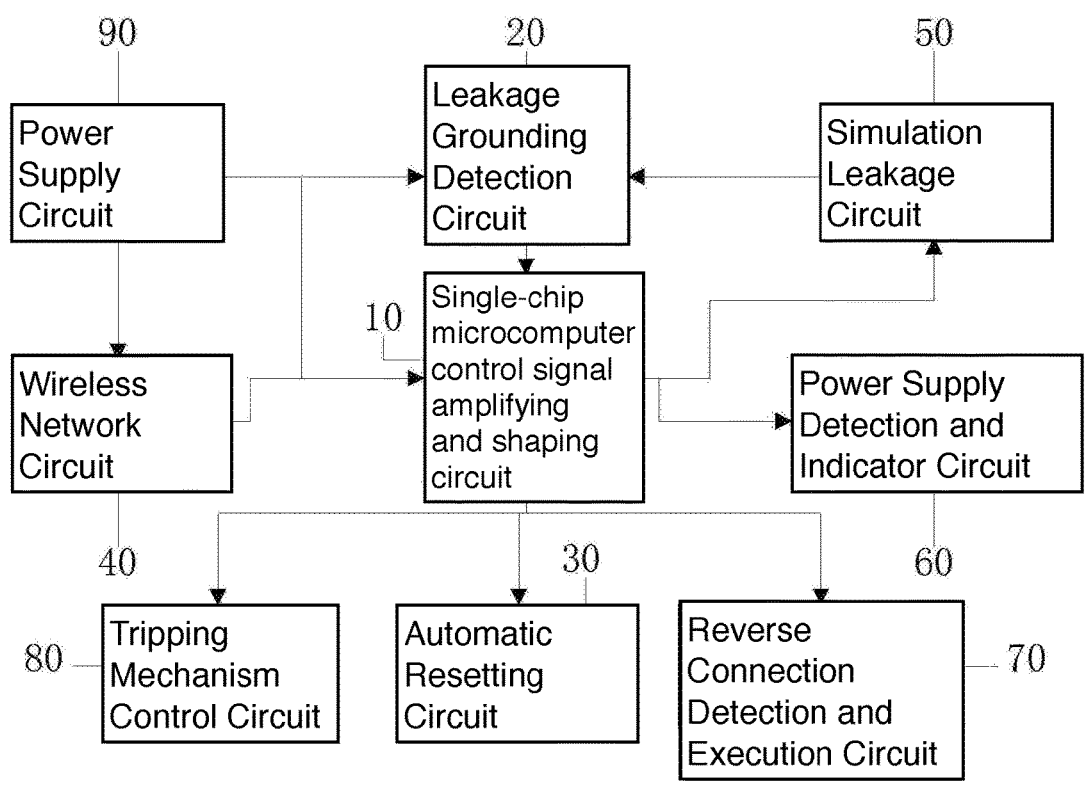
FIG. 2 is a block diagram of another embodiment of a power supply grounding fault protection circuit of the present disclosure.
Figure 3:
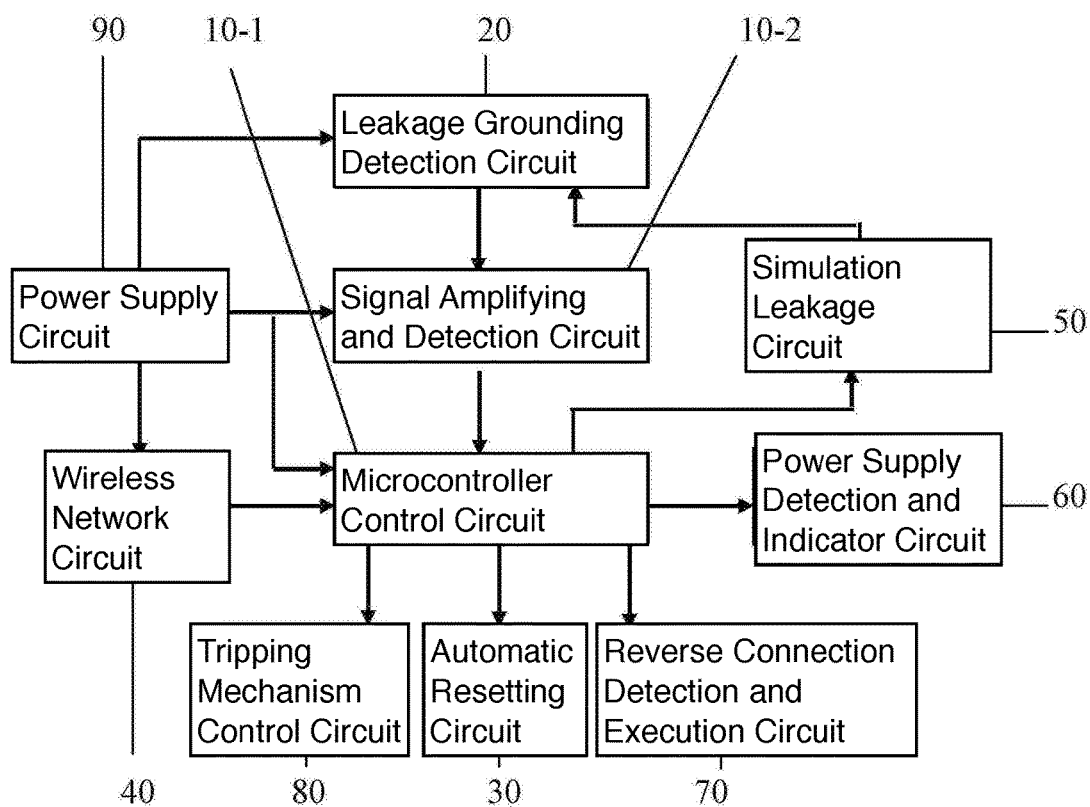
FIG. 3 is a block diagram of yet another embodiment of a power supply grounding fault protection circuit of the present disclosure.

As shown, the signal shaping circuit of the signal amplifying and shaping circuit 10-2, the leakage signal processing IC U5_8 of the leakage detection signal amplifying circuit of the signal amplifying and shaping circuit 10-2, and MCU_8 of the microcontroller control circuit 10-1 may be contained within a single-chip microcontroller control signal amplifying and shaping circuit chip IC U4_6, which is depicted as element 10 in FIG. 2. In other embodiments, the signal amplifying and shaping circuit 10-2 and the microcontroller control circuit 10-1 may be disposed separately, for example as multiple individual IC chips or the like.

Pin 3 of the reset IC U3_6 may be connected to a VCC terminal of the power supply grounding fault protection circuit, pin 2 of the reset ICU3_6 may be connected to a reset terminal (pin 4) of the MCU_8 (pin 6 of IC U4_6), and pin 1 may be grounded. The filter capacitor C12_6 may be respectively connected to pin 1 and pin 2 of the reset ICU3_6. One terminal of the filter capacitor C14_6 may be connected to a power supply terminal (pin 1) of the MCU_8 (pin 20 of ICU4_6), and the other terminal may be grounded. The power supply terminal (pin 1) of the MCU_8 may be connected to the VCC terminal of the power supply grounding fault protection circuit; its ground terminal 16 may be grounded.

The coupling capacitor C30_4, the negative feedback resistor R41_4, and the coupling capacitor C31_4 of the leakage detection signal amplifying circuit of the signal amplifying and shaping circuit 10-2 may be sequentially connected in series between the leakage detection circuit and the grounding detection circuit of the leakage grounding detection circuit 20 (between the capacitor C6_4 and the capacitor C3_4 as shown in FIG. 4). Two terminals of the negative feedback resistor R41_4 may be respectively connected to pin 1 and pin 7 of the leakage signal processing ICU5_8 (pin 1 and pin 17 of IC U4_6).

Filter capacitor C18_8, filter capacitor C19_8, and filter capacitor C20_8 of the signal shaping circuit of the signal amplifying and shaping circuit 10-2 may be connected in parallel at two terminals. One of the two terminals may be grounded, and the other of the two terminals may be connected to pin 5 of the leakage signal processing IC U5_8. One terminal of current limiting resistor R14_8 maybe also be connected to pin 5 of the leakage signal processing IC U5_8, and the other terminal may be connected to pin 3 of the operation amplifier U1A_8. One terminal of filter capacitor C21_8 may be connected to pin 3 of the operation amplifier U1A_8, and the other terminal may be grounded. The voltage divider resistor R13_8 and the voltage divider resistor R4_8 may be connected in series between the power supply voltage VCC and the ground. The connection point of the voltage divider resistor R13_8 and the voltage divider resistor R4_8 may be connected is connected to pin 2 of the operation amplifier U1A_8. The power supply terminal and the ground terminal of the operation amplifier U1A_8 may be respectively connected to the power supply voltage VCC and the ground. Two terminals of the filter capacitor C22_8 may be respectively connected to the power supply terminal of the operation amplifier U1A_8 and the ground. The voltage divider resistor R15_8 and the filter capacitor C23_8 may be connected in series between the power supply voltage VCC and the ground. The connection point where the voltage divider resistor R15_8 and the filter capacitor C23_8 connect may be to pin 1 of the calculating amplifier U1A_8. Pin 1 of the calculating amplifier U1A_8 may be connected to a control signal input terminal pin 13 of the microcontroller MCU_8.

As shown in FIGS. 4, 6, and 8, the power supply filter circuit of the power supply circuit 90 may comprise an inductor T3_4. The first filter and regulator circuit may comprise a current limiting resistor R5_4, a filter capacitor C18_4, and an internal regulator circuit of pin 6 of the leakage signal processing IC U5_8 (pin 16 of ICU 4_6). The inductor T3_4 may be connected between the input terminal of the live line L and pin 1 of the rectifier circuit U27_4. The two terminals of the current limiting resistor R5_4 may be respectively connected to an output terminal pin 3 of the rectifier circuit U27_4 and pin 6 of the leakage signal processing IC U5_8. Filter capacitor C18_4 may be connected between pin 6 of the leakage signal processing IC U5_8 and the ground.

The second filter and regulator circuit may comprise a current limiting resistor R2_4, a stabilivolt DZ1_4, a filter capacitor C7_4, a filter capacitor C6_5, a filter capacitor C13_5, a filter capacitor C74_5, a power supply ICU2_5, a filter capacitor C8_5, a filter capacitor C9_5, a filter capacitor C17_5, and a filter capacitor C10_5. One terminal of the current limiting resistor R2_4 may be connected to pin 3 of the rectifier circuit U27_4, and the other terminal may be connected to pin 2 of the power supply ICU2_5. The positive electrode of the stabilivolt DZ1_4 may be grounded; its negative electrode may be connected to pin 2 of the power supply ICU2_5. Filter capacitor C6_5, filter capacitor C13_5, and filter capacitor C74_5 each may have one terminal grounded, and may have the other terminal connected to pin 2 of the power supply ICU2_5. Filter capacitor C8_5, the filter capacitor C9_5, the filter capacitor C17_5, and the filter capacitor C10_5 each may have one terminal grounded, and may have the other terminal connected to pin 3 of the power supply ICU2_5. Pin 3 of the power supply ICU2_5 may be connected to the VCC terminal of the power supply grounding fault protection circuit, and pin 1 may be grounded.

As shown in FIG. 4, in the present embodiment, the power supply circuit 90 may be further provided with a piezoresistor RY1_4 and an over-current protection resistor F1_4. The piezoresistor RY1_4 may be connected between an input terminal of the live line L and an input terminal of the neutral line N. The over-current protection resistor F1_4 may be connected between the input terminal of the live line L and an input terminal of the power supply filter circuit.

In other embodiments, piezoresistor RY1_4 and/or the over-current protection resistor F1_4 may be omitted, and the objectives of the present disclosure may still be achieved.

As shown in FIG. 4, the leakage detection circuit of the leakage grounding detection circuit 20 may comprise a current coupling induction coil T1_4 and a capacitor C6_4.

The capacitor C6_4 may be connected to the two terminals of the current coupling induction coil T1_4 to form a filter circuit. The filter circuit may be connected to pin 2 and pin 3 of the leakage signal processing IC U5_8 of the signal amplifying and shaping circuit 10-2. The supply lines of the ground fault protection circuit may pass through the current coupling induction coil T1_4.

The grounding detection circuit of the leakage grounding detection circuit 20 may comprise a current coupling induction coil T2_4 and a capacitor C3_4. The capacitor C3_4 may be connected to the two terminals of the current coupling induction coil T2_4 to form a filter circuit. One terminal of the filter circuit may be grounded, and the other terminal may be connected, via the coupling capacitor C31_4 of the leakage detection signal amplifying circuit, to pin 7 of the leakage signal processing IC U5_8 of the signal amplifying and shaping circuit (pin 17 of IC U4_6). The supply lines of the ground fault protection circuit may pass through the current coupling induction T2_4.

As shown in FIGS. 4, 6, and 8, the power supply detection circuit of the power supply detection and indicator circuit 60 may comprise rectifier circuit U27_4, current limiting resistor R5_4, an internal regulator circuit of pin 6 of the leakage signal processing IC U5_8 (pin 16 of IC U4_6), a filter capacitor C18_4, a voltage divider resistors R6_6, a voltage divider resistor R3_6, a filter capacitor C11_6, and the microcontroller MCU_8. The two terminals of the current limiting resistor R5_4 may be respectively connected to the output terminal pin 3 of the rectifier circuit U27_4 and pin 6 of the leakage signal processing IC U5_8. The filter capacitor C18_4 may be connected between pin 6 of the leakage signal processing IC U5_8 and the ground, one terminal of the voltage divider resistor R6_6 may be connected to pin 6 of the leakage signal processing IC U5_8, and the other terminal may be connected in series to the voltage divider resistor R3_6, which may be grounded. The connection point of the voltage divider resistor R6_6 and the voltage divider resistor R3_6 may be connected to a detection terminal pin 6 of the microcontroller MCU_8 (pin 5 of IC U4_6). One terminal of the filter capacitor C11_6 may be grounded, and the other terminal may be connected to the detection terminal pin 6 of the microcontroller MCU_8.

The indicator circuit of the power supply detection and indicator circuit 60 may comprise a normal signal output terminal pin 5 and a fault signal output terminal pin 2 of the microcontroller MCU_8 (pins 14 and 13 of IC U4_6, respectively), a current limiting resistor R8_6, a current limiting resistor R11_6, and a red LED and green LED of LED indicator D10_6. The current limiting resistor R8_6 may be connected between the fault signal output terminal of the microcontroller MCU_8 and the negative electrode of a red LED of LED indicator D10_6. The current limiting resistor R11_6 may be connected between the normal signal output terminal of the microcontroller MCU_8 and the negative electrode of a green LED of LED indicator D10_6. The positive electrode of the red LED and the positive electrode of the green LED may be connected to VCC.

As shown in FIGS. 4, 6, and 8, the control circuit of the tripping mechanism control circuit 80 may comprise the microcontroller MCU_8, a filter capacitor C5_6, a current limiting resistor R7_6, a one-way silicon controlled rectifier SCR1_4, one-way silicon controlled rectifier SCR4_4, a filter capacitor C12_4, a surge absorption resistor C21_4, and a relay T3_4 that interfaces with inductor coil T3_4. The filter capacitor C5_6 may be connected between a triggering signal terminal pin 3 of the MCU_8 (pin 7 of IC U4_6) and the ground. Current limiting resistor R7_6 may be connected between the triggering signal terminal pin 3 of the MCU_8 and the control electrodes of both one-way silicon controlled rectifier SCR1_4 and one-way silicon controlled rectifier SCR4_4. The anodes of the one-way silicon controlled rectifier SCR1_4 and one-way silicon controlled rectifier SCR4_4 may be connected to the connection point where the coil of the relay T3_4 is connected to the AC input (pin 1) of the rectifier circuit U27_4. The cathodes or way silicon controlled rectifier SCR1_4 and one-way silicon controlled rectifier SCR4_4 may be grounded. The surge absorption capacitor C12_4 and the surge absorption resistor R21_4 may be connected in series between the anodes of the one-way silicon controlled rectifiers SCR1_4 and SCR4_4 and the ground. Relay T3_4 may drive the reset switch into action through a mechanical link. In alternative embodiments, one of the one-way silicon controlled rectifiers SCR1_4, SCR4_4 may be omitted.

The manual detection circuit 40 may comprise a current limiting resistor R1_4 and a press switch S3_4. The current limiting resistor R1_4 and the press switch S3_4 may be connected in series, with one terminal is connected to the input terminal of the neutral line N of the ground fault protection circuit, and the other terminal connected to the receptacle output of the live line.

In some embodiments, manual detection circuit 20a may be omitted, and the objectives of the present disclosure may still be achieved.

As shown in FIGS. 4, 6, and 8, the reverse connection detection control circuit of the reverse connection detection and execution circuit 70 may comprise microcontroller MCU_8, a filter capacitor C15_6, a triggering current limiting resistor R10_6, a heavy and light current isolation optocoupler U6_4, a triggering current limiting resistor R19_4, an anti-false-triggering current limiting resistor R20_4, and a two-way silicon controlled rectifier SCR3_4. The filter capacitor C15_6 may be connected between a SCR triggering terminal pin 8 of MCU_8 (pin 10 of IC U4_6) and the ground. The current limiting resistor R10_6 may be connected between the SCR triggering terminal pin 8 of the MCU_8 and a triggering control terminal pin 2 of the heavy and light current isolation optocoupler U6_4. A power supply terminal pin 1 of the heavy and light current isolation optocoupler U6_4 may be connected to the VCC terminal of the power supply grounding fault protection circuit. One terminal of the triggering current limiting resistor R19_4 may be connected to a second T2 electrode of the two-way silicon controlled rectifier SCR3_4; the other terminal may be connected to the output terminal L_load of the live line L. The anti-false-triggering current limiting resistor R20_4 may be connected between the control electrode and a first T2 electrode of the two-way silicon controlled rectifier SCR3_4. The control electrode of the two-way silicon controlled rectifier SCR3_4 may be connected to a second output terminal of the heavy and light current isolation optocoupler U6_4. A first output terminal of the heavy and light current isolation optocoupler U6_4 may be connected to the output terminal of the output terminal L_load of the live line L.

As shown in FIG. 4, the detection and execution circuit of the reverse connection detection and execution circuit 70 may comprise a surge absorption capacitor C11_4, a surge absorption capacitor C13_4, a normally-closed contact K1_4, a normally-open contact K2_4, a surge absorption resistor R18_4, a normally-closed switch S2_4, and a reverse relay T4_4. In this disclosure, the terms normally-open and normally-closed refer to the initial state of element in the GFCI, for example the state of a new GFCI prior to installation. The surge absorption capacitor C11_4 and the surge absorption capacitor C13_4 may be connected in series. One terminal of the surge absorption capacitor C13_4, along with the normally-closed contact K1_4 and the normally-open contact K2_4 may be connected to a first output terminal of the heavy and light current isolation optocoupler U6_4. One terminal of the surge absorption capacitor C11_4, along with the other terminal of the normally-closed contact K1_4 and the normally-open contact K2_4, may be connected to a second terminal of the heavy and light current isolation optocoupler U6_4 via the anti-false-triggering current limiting resistor R20_4. One terminal of the surge absorption resistor R18_4 may be connected to the terminal of the surge absorption capacitor C11_4 that is connected to the surge absorption capacitor C13_4; the other terminal of the surge absorption resistor R18_4 may be connected to the output terminal N_load of the neutral line N. The normally-closed switch S2_4 may be provided on live line L and the neutral line N, and may be located between the output terminals L_load_4, N_load and the reset switch S1_4. The normally-closed switch S2_4 may be linked with the normally-open contact K2_4. The reverse relay T4_4 may have one terminal of its control terminals connected to the second output terminal of the heavy and light current isolation optocoupler U6_4 via the anti-false-triggering current limiting resistor R20_4, and may have its other terminal connected to the output terminal N_load of the neutral line N. The reverse relay T4_4 may drive the normally-closed switch S2_4.

Figure 7:
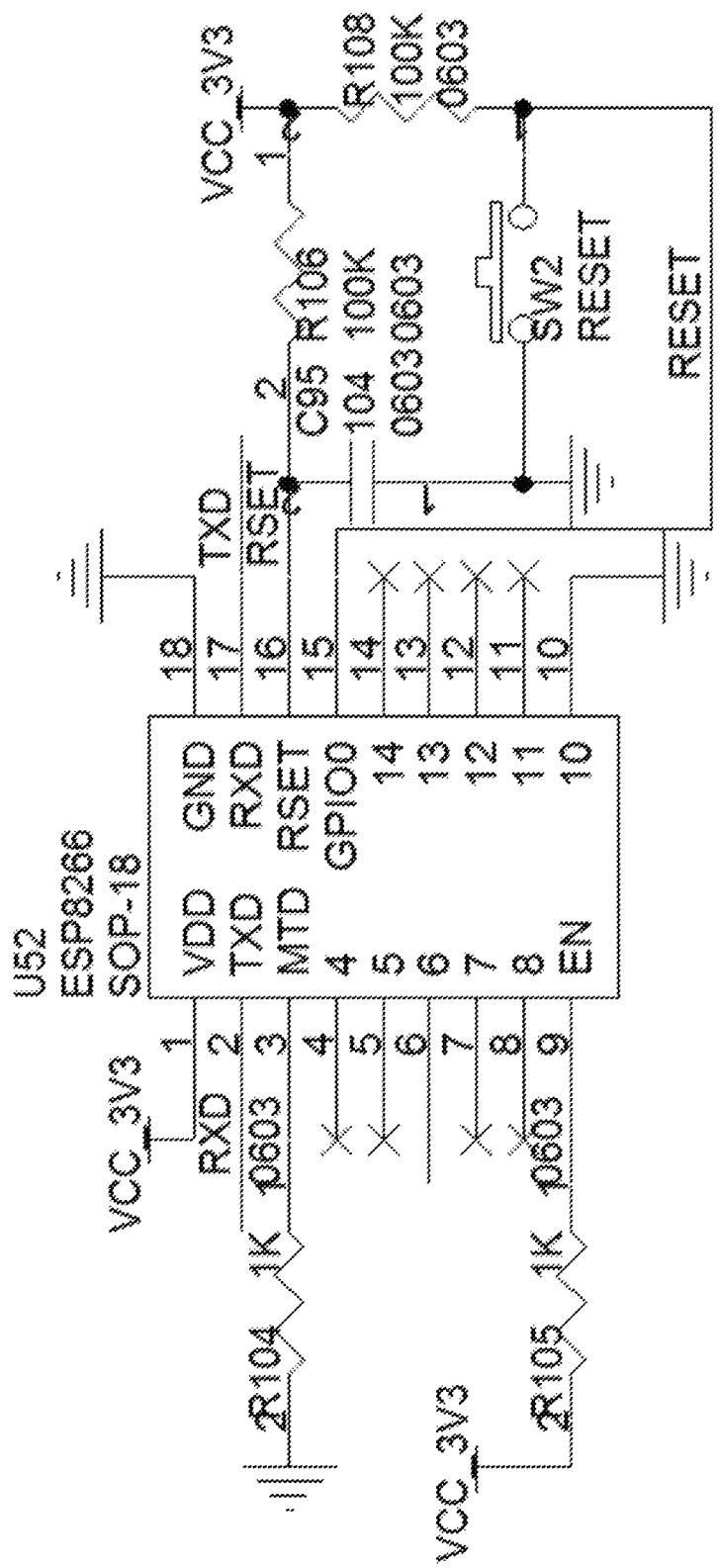
FIG. 7 is a fourth circuit diagram of a portion of an embodiment of a ground fault protection circuit of FIG. 4.

As shown in FIGS. 7 and 8, the wireless network circuit 40 may comprise a wireless network IC U52_7, a WIFI reset switch S2_7 (which may be used to reset the WIFI module), wireless reset resistors R106_7 and R108_7, a wireless reset filter resistor R104_7, a wireless reset filter capacitor C95_7, and a wireless enabling resistor R105_7. Wireless network IC U52_7 may be an IC of 18 pins with WIFI function.

One pin of the wireless reset filter resistor R104_7 may be grounded and the other pin may be connected to pin 3 of the wireless network IC U52_7. One pin of the wireless reset filter capacitor C95_7 may be grounded, and the other pin may be connected to pin 16 of the wireless network IC U52_7. One pin of the wireless reset resistor R106_7 may be connected to VCC of the power supply, and the other pin may be connected to pin 16 of the wireless network ICU52_7. One pin of the wireless enabling resistor R105_7 may be connected to VCC of the power supply, and the other pin may be connected to pin 9 of the wireless network IC U52_7. One pin of the wireless reset resistor R108_7 may be connected to VCC, and the other pin may be connected to pin 15 of the wireless network IC U52_7. One pin of the WIFI reset switch S2_7 may be grounded, and the other pin may be connected to pin 15 of the wireless network IC U52_7. Pin 2 of the wireless network IC U52_7 may be connected to pin 15 of the microcontroller MCU_8 (pin 9 of IC U4_6). Pin 17 of the wireless network ICU52_7 may be connected to pin 14 of the microcontroller MCU_8 (pin 8 of IC U4_6). Pin 15 of the wireless network ICU52_7 may be connected to pin 13 of the microcontroller MCU_8 (pin 18 of IC U4_6). Pin 16 of the wireless network IC U52_7 may be connected to pin 12 of the microcontroller MCU_8 (pin 18 of IC U4_6).

As shown in FIGS. 4, 6, and 8, the automatic resetting circuit 30 may comprise an automatic resetting iron core T5_4, a surge absorption filter capacitor C14_4, a surge absorption resistor R22_4, and an automatic resetting driving circuit. The automatic resetting driving circuit may comprise a silicon controlled rectifier SCR5_4 and a driving resistor R12_6. One terminal of the automatic resetting iron core T5_4 may be connected to an over-current protection resistor F1_4 on the input terminal of the live line L. Alternatively, automatic resetting iron core T5_4 may be connected directly connected to the input terminal of the live line L. The other terminal of automatic resetting iron core T5_4 may be connected to pin 3 of the silicon controlled rectifier SCR5_4 through the surge absorption filter capacitor C14_4 and the surge absorption resistor R22_4, which may be connected in series. Pin 2 of the silicon controlled rectifier SCR5_4 may be connected to the automatic resetting iron core T5_4, and pin 3 of the silicon controlled rectifier SCR5_4 may be grounded. One terminal of driving resistor R12_6 may be connected to pin 9 of the MCU_8 of the microcontroller control circuit 10-1 (pin 11 of IC U4_6) and a filter capacitor C16_6; the other terminal of driving resistor R12_6 may be connected to pin 1 of the silicon controlled rectifier SCR5_4. One terminal of the filter capacitor C16_6 may be grounded. The microcontroller control circuit 10-1 may receive wireless control signal through the wireless network circuit 40, and may control the resetting iron core T5_4 through the automatic resetting circuit 30, so as to carry out automatic resetting.

As shown in FIGS. 4, 6, and 8, the simulation leakage circuit 50 may comprise microcontroller MCU_8, a filter capacitor C4_6, a current limiting resistor R9_6, a one-way silicon controlled rectifier SCR2_4, and a current limiting resistor R10_4. One terminal of the filter capacitor C4_6 may be grounded, and the other terminal may be connected to a simulation signal triggering terminal pin 7 of the microcontroller MCU_8 (pin 15 of IC U4_6). One terminal of the current limiting resistor R9_6 may be connected to the simulation signal triggering terminal pin 7 of the microcontroller MCU_8, and the other terminal may be connected to the control electrode of the one-way silicon controlled rectifier SCR2_4. The one-way silicon controlled rectifier SCR2_4 and the limiting resistor R10_4 may be connected in series between the live line L and the ground. The anode of the one-way silicon controlled rectifier SCR2_4 may be connected to limiting resistor R10_4. The connection point where limiting resistor R10_4 may be connected to the live line L is located after the position where the live line L of the municipal electricity passes through current coupling induction coil T2_4 and is located before the reset switch S1_4.

In other embodiments, the simulation leakage circuit 50 may be omitted, and the objectives of the present disclosure may still be achieved.

A GFCI with the with the power supply grounding fault circuit of the present disclosure may work as follows:

Booting and power-on self-test: When powered on in a reset state (when S1_4 is closed), U4_6 provides a self-test to check functionality. Specifically, U4_6 conducts a two step power-on self-test when it receives a normal power supply at pin 20, a normal reset signal at pin 6, and a normal power supply detection signal at pin 6. If pin 6 of U4_6 is not able to detect a normal power supply detection signal, U4_6 will directly output low voltage at pin 13, which powers the red LED to remind the user of the failure of the GFCI and the need of replacement.

The first step of the self-test is automatic reverse connection detection. Upon booting up, pin 10 of U4_6 first will output a low voltage reverse connection automatic detection driving signal for approximately 15 ms, which renders optocoupler U6_4 conductive through C15_6 and R10_6. In turn, this triggers the two-way silicon controlled rectifier SCR3_4 into a conductive state. Then, reverse relay T4_4 is energized through a path from L_load and SCR3_4 to N_load, thereby disconnecting the normally-closed contact S2_4. As a result, L_load and N_load are instantly disconnected from the AC input L and N, de-energizing T4_4, closing opened normally-closed contact S2_4, and energizing L_load and N_load, which supply power to the load and T4_4, repeating the cycle. After approximately 15 ms, the low voltage reverse connection automatic detection driving signal ceases, U6_4 no longer conducts and SCR3_4 is completely disconnected, deenergizing T4_4, closing S2_4, and assuring normal power supply for the load through L_load and N_load. Typically, 1-3 cycles of opening and closing S2_4 due to energizing and de-energizing may occur in 15 ms.

In the case of reverse connection (e.g., if the municipal electricity is connected to the load output terminals of L_load and N_load rather than input terminals of L/N), the energizing of reverse relay T4_4 will close the normally-open contact K2_4 of T4_4. Thus, the reversely connected municipal power supply will supply power to T4_3 through L_load and N_load and K2_4, even after the low voltage reverse connection automatic detection driving signal ceases. T4_4 will remain electrically pulled in, keeping contact K2_4 closed, disconnecting input terminals L/N and power socket L1/N1 from L_load and N_load, and assuring safety of users.

In the second step of the power-on self-test, U4_5 conducts a booting leakage self-test. Pin 16 of U4_5 outputs high voltage for 50 ms, which, after current limiting by R9_6, drives the silicon controlled rectifier SCR2_4 into a conductive state, and simulates leakage from live line L to the ground through R10_4. In a normal working case, U4_6 will receive a high voltage control signal at an internal register, based on a leakage signal from leaking grounding detection circuit 20. Then, pin 13 of U4_6 will output a low voltage signal, which powers on the green LED, indicating that the circuit is working properly. However, the high voltage control signal is not received at the internal register, it means that there is an abnormality in the leakage grounding detection circuit; pin 14 of U4_6 outputs high voltage, and pin 13 outputs low voltage, powering on the red LED to indicate that the circuit has failed and remind users to replace it.

Tripped state automatic reverse connection protection: When in a tripped state, the self-test protection function is as follows. In a tripped state, S1_4 is disconnected and K1_4 is closed. Relay T4_4 is directly connected to L_Load via K1_4 and is energized and pulled in, opening normally-closed contact S2_4 and closing normally-open contact K2_4. The opening of S2_4 disconnects input terminals L/N and L1/N1 from L_Load/N_load, assuring safety of users. As long as the reverse connection exists, relay T4_4 remains self-locked and remains powered via K1_4. The perpetual self-locking state, where the socket and L/N of the grounding fault interrupter are not powered, reminds users of the connection error and the need to re-install.

Leakage and abnormal grounding protection: When working properly, the circuit will detect leakage or abnormal grounding, and enter the tripping state as follows. Leakage or abnormal grounding will result in abnormal signals through T1_4 and T2_4, which are filtered through C6_4 and C3_4, respectively. After traveling through C30_4 and C31_4, respectively, the signals enter pins 1 and 7 of U4_6, respectively. If it detects a high voltage signal IC U4_6 will output a high voltage signal of 25 ms at its pin 7 (pin 3 of MUC_8), which, after filtering through C5_6 and current limiting by R7_6, triggers the silicon controlled rectifier SCR1_4 into a conductive state. Then, a large current instantly passes through the relay T3_3 to drive the tripping mechanism to be tripped, opening reset button S1_3, disconnecting the load circuit and socket from the power supply, and protecting the circuit and safety of users.

Wireless signal controlling: A wireless signal may be received by wireless network circuit 40, and transformed into digital signal in a wireless module. Pin 2 of Wireless network IC may U52_7 may communicate with U4_6/MCU_8 via a serial communication circuit for by pins 2 and 19 of U52_7, for sending and receiving signal signals respectively, and pins 9 and 8 of U4_6 (pins 15 and 14 of MCU_8) for receiving and sending respectively. Thus, the transformed signal may be delivered, via the serial communication circuit, to the microcontroller for processing and controlling. When appropriate, the iron core may be driven to automatically reset the GFCI by a signal sent on pin 11 of IC U4_6 (pin 9 of MCU_8) that places SCR5_4 into a conductive state.

Regular cyclic self-test: After a power-on self-test, U4_6 may be set (by the program) to periodically conduct a self-test, for example every 150 minutes. The principle for the self-test is identical to that for the leakage self-test of the second step of the power-on self-test of U4_6.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A power supply grounding fault protection circuit, comprising:
   a power supply circuit;
   a leakage grounding detection circuit;
   a signal amplifying and shaping circuit;
   a microcontroller control circuit;
   a power supply detection and indicator circuit;
   a tripping mechanism control circuit;
   a reverse grounding detection and execution circuit;
   a wireless network circuit; and
   an automatic resetting circuit, wherein:
   the leakage grounding detection circuit comprises a leakage detection circuit and a grounding detection circuit, which detect leakage failure and grounding failure, respectively;
   the signal amplifying and shaping circuit comprises a leakage detection signal amplifying circuit and a signal shaping circuit, which are connected to each other and carry out amplifying and shaping on a leakage detection signal;
   the microcontroller control circuit carries out power-on self-test and reset for the power supply grounding fault protection circuit;
   the power supply detection and indicator circuit comprises a power supply detection circuit and an indicator circuit, which are connected to each other and carry out detection and displaying of a power status;
   the tripping mechanism control circuit comprises a reset switch, which is provided on a live line and a neutral line of the ground fault protection circuit, and a control circuit that controls the reset switch;

the reverse grounding detection and execution circuit comprises a reverse connection detection control circuit and a detection and execution circuit, which are connected to each other and carry out detecting of a reverse connection of the ground fault protection circuit in a reset state and in a tripped state;

the wireless network circuit carries out sending and receiving of wireless signals of the power supply grounding fault protection circuit and is respectively connected to the power supply circuit and the microcontroller control circuit;

the automatic resetting circuit is connected to the microcontroller control circuit and carries out controlling and driving of resetting actions of the reset switch of the tripping mechanism control circuit;

the power supply circuit comprises a power supply filter circuit, a first rectifier circuit, a first filter and regulator circuit, and a second filter and regulator circuit;

the first filter and regulator circuit is connected to the leakage grounding detection circuit;

the second filter and regulator circuit is connected to the signal amplifying and shaping circuit and the microcontroller control circuit;

the leakage grounding detection circuit, the signal amplifying and shaping circuit, and the microcontroller control circuit are connected in sequence;

the microcontroller control circuit is connected to the power supply detection and indicator circuit, the tripping mechanism control circuit, and the reverse connection detection and execution circuit;

the power supply filter circuit is connected to an input terminal of the live line;

a first input terminal and a second input terminal of the first rectifier circuit are respectively connected to an input terminal of the neutral line and an output terminal of the power supply filter circuit;

a first pin of the first rectifier circuit is grounded;

a second pin of the first rectifier circuit is connected to the both the first filter and regulator circuit and the second filter and regulator circuit;

the reset switch is positioned on the live line and the neutral line after the grounding detection circuit;

the microcontroller control circuit comprises a microcontroller, a first capacitor, and a reset filter circuit;

the reset filter circuit comprises a reset IC and a second capacitor;

a first pin of the reset IC is connected to a VCC of the ground fault protection circuit, a second pin of the reset IC is connected to a reset terminal of the microcontroller, and a third pin of the reset IC is grounded;

the second capacitor is connected between the second and third pins of the reset IC;

the first capacitor is connected between a power supply terminal of the microcontroller and a ground;

the power supply terminal of the microcontroller is connected to the VCC;

a ground terminal of the microcontroller is grounded;

the leakage detection signal amplifying circuit comprises a leakage signal processing IC, a third capacitor, a first resistor, and a fourth capacitor;

the first resistor and the fourth capacitor are connected in series between the leakage detection circuit and the grounding detection circuit;

the first resistor is connected between a first pin and a second pin of the leakage signal processing IC;

the signal shaping circuit comprises an operation amplifier, a fifth capacitor, a sixth capacitor, a seventh capacitor, a second resistor, a third resistor, a fourth resistor, an eighth capacitor, a ninth capacitor, a tenth capacitor, and a fifth resistor;

the fifth, sixth and seventh capacitors are connected in parallel between the ground and a third pin of the leakage signal processing IC;

the second resistor is connected between a fourth pin of the leakage signal processing IC and a first pin of the operation amplifier;

the third and fourth resistors are connected in series between the VCC and the ground;

a connection point of the third and fourth resistors is connected to a second pin of the operation amplifier;

the eighth capacitor is connected between ground and the first pin of the operation amplifier;

a power supply terminal and a ground terminal of the operation amplifier are respectively connected to the VCC and the ground;

the ninth capacitor is connected between the power supply terminal of the operation amplifier and the ground;

the fifth resistor and the tenth capacitor are disposed in series between the VCC and the ground;

a connection point of the fifth resistor and the tenth capacitor is connected to a third pin of the operation amplifier; and the third pin of the operation amplifier is connected to a control signal input terminal of the microcontroller.

2. The power supply grounding fault protection circuit of claim 1, wherein the signal shaping circuit, the leakage signal processing IC, and the microcontroller of the microcontroller circuit are contained within a single microcontroller control signal amplifying and shaping circuit chip.

3. The power supply grounding fault protection circuit of claim 2, wherein:

the power supply filter circuit comprises an inductor coil;

the first filter and regulator circuit comprises a sixth resistor, an eleventh capacitor, and an internal regulator circuit of a first pin of a leakage signal processing IC;

the inductor coil is connected between the input terminal of the live line and the second input terminal of the first rectifier circuit;

the sixth resistor is connected between the second pin of the first rectifier circuit and the fifth pin of the leakage signal processing IC;

the eleventh capacitor is connected between the fifth pin of the leakage signal processing IC and the ground;

the second filter and regulator circuit comprises a seventh resistor, a stabilivolt, a twelfth capacitor, a thirteenth capacitor, a fourteenth capacitor, a fifteenth capacitor, a power supply IC, an sixteenth capacitor, a seventeenth capacitor, a eighteenth capacitor, and a nineteenth capacitor;

the seventh resistor is connected between the second pin of the first rectifier circuit and a first pin of the power supply IC;

a positive electrode of the stabilivolt is grounded;

a negative electrode of the stabilivolt is connected to first pin of the power supply IC;

the thirteenth, fourteenth, and fifteenth capacitors are connected in parallel between the first pin of power supply IC and the ground;

the sixteenth, seventeenth, eighteenth, and nineteenth capacitors are connected in parallel between a second pin of the power supply IC and the ground;

the second pin of the power supply IC is connected to the VCC;

a third pin of the power supply IC is grounded;

the leakage detection circuit comprises a first current coupling induction coil and a twentieth capacitor;

the twentieth capacitor is connected between a first terminal and a second terminal of the first current coupling induction coil;

the first and second terminals of the first current coupling induction coil are connected to a sixth and a seventh pin of the leakage signal processing IC, respectively;

the live and neutral lines pass through the first current coupling induction coil;

the grounding detection circuit comprises a second current coupling induction coil and a twenty-first capacitor;

the twenty first capacitor is connected to a first terminal and a second terminal of the second current coupling induction coil;

the first and second terminals of the second current coupling induction coil are grounded and connected, respectively, via the fourth capacitor to the second pin of leakage signal processing IC, respectively; and the live and neutral lines pass through the second current coupling induction coil;

the power supply detection circuit includes the first rectifier circuit, the sixth resistor, the internal regulator circuit, the eleventh capacitor, an eighth resistor, a ninth resistor, a twenty-second capacitor, and the microcontroller;

the sixth resistor is connected between the second pin of the first rectifier circuit and the fifth pin of the leakage signal processing IC;

the third capacitor is connected between the fifth pin of the leakage signal processing IC and the ground;

the eighth resistor is connected between the fifth pin of the leakage signal processing IC and the ninth resistor, which is grounded;

a connection point of the eighth and ninth resistors is connected to a detection terminal of the microcontroller;

the twenty-second capacitor is connected between the ground and the detection terminal of the microcontroller;

the indicator circuit includes a normal signal output terminal and a fault signal output terminal of the microcontroller, a tenth resistor, an eleventh resistor, a red LED, and a green LED;

the tenth resistor is connected between the fault signal output terminal of the microcontroller and a negative electrode of the red LED;

the eleventh resistor is connected between the normal signal output terminal of the microcontroller and a negative electrode of the green LED;

a positive electrode of the red LED and a positive electrode of the green LED are connected to the VCC;

the control circuit of the tripping mechanism control circuit comprises the microcontroller, a twenty-third capacitor, a twelfth resistor, a first one-way silicon controlled rectifier, a twenty-fourth capacitor, a thirteenth resistor, and a relay that interfaces with the inductor coil;

the twenty-third capacitor is connected between a triggering signal terminal of the microcontroller and the ground;

the twelfth resistor is connected between the triggering signal terminal of the microcontroller and a control electrode of the first one-way silicon controlled rectifier;

an anode of the first one-way silicon controlled rectifier is connected to a connection point where the inductor coil is connected to the second input terminal of the first rectifier circuit;

a cathode of the first one-way silicon controlled rectifier is grounded;

the twenty-fourth capacitor and the thirteenth resistor are connected in series between the anode of the first one-way silicon controlled rectifier and the ground;

the relay drives the reset switch through a mechanical link;

the reverse connection detection control circuit comprises the microcontroller, a twenty-fifth capacitor, a fourteenth resistor, a heavy and light current isolation optocoupler, a fifteenth resistor, a sixteenth resistor, and a two-way silicon controlled rectifier;

the twenty-fifth capacitor is connected between an SCR triggering terminal of the microcontroller and the ground;

the fourteenth resistor is connected between the SCR triggering terminal of the microcontroller and a triggering control terminal of the heavy and light current isolation optocoupler;

a power supply terminal of the heavy and light current isolation optocoupler is connected to the VCC;

the fifteenth resistor is connected between a second T2 electrode of the two-way silicon controlled rectifier and a load output terminal of the live line;

the sixteenth resistor is connected between a control electrode and a first T2 electrode of the two-way silicon controlled rectifier;

the control electrode of the two-way silicon controlled rectifier is connected to a second output terminal of the heavy and light current isolation optocoupler;

an output terminal of the heavy and light current isolation optocoupler is connected to the load output terminal of the live line;

the detection and execution circuit comprises a twenty-sixth capacitor, a twenty-seventh capacitor, a normally-closed contact, a normally-open contact, a seventeenth resistor, a normally-closed switch, and a reverse relay;

the twenty-sixth capacitor and the twenty-seventh capacitor are connected in series;

a first output terminal of the heavy and light current isolation optocoupler is connected to a first terminal of the twenty-seventh capacitor, a first terminal of the normally-closed contact, and a first terminal of the normally-open contact;

the second output terminal of the heavy and light current isolation optocoupler is connected to the twenty-sixth capacitor, a second terminal of the normally-open contact, and a second terminal of the normally-closed contact through the sixteenth resistor;

the seventeenth resistor is connected between a connection point between the twenty-sixth and twenty-seventh capacitors and a load output terminal of the neutral line;

the normally-closed switch is provided on the live and neutral lines between the load output terminals of the live and neutral lines and the reset switch;

the normally-closed switch is linked with the normally-open contact;

a first terminal of the reverse relay is connected to the second output terminal of the heavy and light current isolation optocoupler via the sixteenth resistor;

a first terminal of the reverse relay is connected to the load output terminal of the neutral line; and the reverse relay drives the normally-closed switch through a mechanical link.

4. The power supply grounding fault protection circuit of claim 3, further comprising a simulation leakage circuit connected to the microcontroller control circuit and the leakage grounding detection circuit, wherein:

the simulation leakage circuit comprises the microcontroller, a twenty-eighth capacitor, an eighteenth resistor, a second one-way silicon controlled rectifier, and a nineteenth resistor;

the twenty-eighth capacitor is connected between ground and a simulation signal triggering terminal of the microcontroller;

the eighteenth resistor is connected between the simulation signal triggering terminal of the microcontroller and a control electrode of the second one-way silicon controlled rectifier;

the second one-way silicon controlled rectifier and the nineteenth resistor are connected in series between the live line and the ground; and the nineteenth resistor is connected between an anode of the second one-way silicon controlled rectifier and the live line next to the reset switch.

5. The power supply grounding fault protection circuit of claim 1, further comprising a simulation leakage circuit connected to the microcontroller control circuit and the leakage grounding detection circuit.

6. The power supply grounding fault protection circuit of claim 1, wherein:

the wireless network circuit comprises a wireless network IC, a WIFI reset switch, a first wireless reset resistor, a second wireless reset resistor, a wireless reset filter resistor, a wireless reset filter capacitor, and a wireless enabling resistor;

the wireless network IC has WIFI functionality;

the wireless reset filter resistor is connected between ground and a first pin of the wireless network IC;

the wireless reset filter capacitor is connected between ground and a second pin of the wireless network IC;

the first wireless reset resistor is connected between a VCC of the ground fault protection circuit and the second pin of the wireless network IC;

the wireless enabling resistor is connected between the VCC and a third pin of the wireless network IC;

the second wireless reset resistor is connected between the VCC and a fourth pin of the wireless network IC;

the WIFI reset switch is connected between the ground and the fourth pin of the wireless network IC;

a fifth pin of the wireless network IC is connected to first pin of a microcontroller of the microcontroller control circuit;

a sixth pin of the wireless network IC is connected to second pin of the microcontroller;

the fourth pin of the wireless network IC is connected to a third pin of the microcontroller; and the second pin of the wireless network IC is connected to a fourth pin of the microcontroller.

7. The power supply grounding fault protection circuit of claim 1, wherein:

the automatic resetting circuit comprises an automatic resetting iron core, a surge absorption filter capacitor, a surge absorption resistor, and an automatic resetting driving circuit;

the automatic resetting driving circuit comprises a silicon controlled rectifier and a driving resistor;

a first terminal of the automatic resetting iron core is connected to an input terminal of a live line of the power supply grounding fault protection circuit;

a second terminal of the automatic resetting iron core is connected to a first pin of the silicon controlled rectifier through the surge absorption filter capacitor and the surge adsorption resistor, which are connected in series;

a second pin of the silicon controlled rectifier is connected to the automatic resetting iron core;

the first pin of the silicon controlled rectifier five is grounded;

the driving resistor is connected to a fifth pin of a microcontroller of the microcontroller control circuit and a third pin of the silicon controlled rectifier;

the fifth pin of the microcontroller is grounded via a filter capacitor; and the microcontroller control circuit is configured to carry out automatic resetting by receiving wireless control signals through the wireless network circuit and by controlling the resetting iron core through the automatic resetting circuit.

8. A power supply grounding fault protection circuit, comprising:

a power supply circuit;

a leakage grounding detection circuit;

a signal amplifying and shaping circuit;

a microcontroller control circuit;

a power supply detection and indicator circuit;

a tripping mechanism control circuit;

a reverse grounding detection and execution circuit;

a wireless network circuit; and an automatic resetting circuit, wherein:

the wireless network circuit comprises a wireless network IC, a WIFI reset switch, a first wireless reset resistor, a second wireless reset resistor, a wireless reset filter resistor, a wireless reset filter capacitor, and a wireless enabling resistor;

the wireless network IC has WIFI functionality;

the wireless reset filter resistor is connected between ground and a first pin of the wireless network IC;

the wireless reset filter capacitor is connected between ground and a second pin of the wireless network IC;

the first wireless reset resistor is connected between a VCC of the ground fault protection circuit and the second pin of the wireless network IC;

the wireless enabling resistor is connected between the VCC and a third pin of the wireless network IC;

the second wireless reset resistor is connected between the VCC and a fourth pin of the wireless network IC;

the WIFI reset switch is connected between the ground and the fourth pin of the wireless network IC;

a fifth pin of the wireless network IC is connected to first pin of a microcontroller of the microcontroller control circuit;

a sixth pin of the wireless network IC is connected to second pin of the microcontroller;

the fourth pin of the wireless network IC is connected to a third pin of the microcontroller; and the second pin of the wireless network IC is connected to a fourth pin of the microcontroller.

9. The power supply grounding fault protection circuit of claim 8, wherein:

the leakage grounding detection circuit comprises a leakage detection circuit and a grounding detection circuit, which detect leakage failure and grounding failure, respectively;

the signal amplifying and shaping circuit comprises a leakage detection signal amplifying circuit and a signal shaping circuit, which are connected to each other and carry out amplifying and shaping on a leakage detection signal;

the microcontroller control circuit carries out power-on self-test and reset for the power supply grounding fault protection circuit;

the power supply detection and indicator circuit comprises a power supply detection circuit and an indicator circuit, which are connected to each other and carry out detection and displaying of a power status;

the tripping mechanism control circuit comprises a reset switch, which is provided on a live line and a neutral line of the ground fault protection circuit, and a control circuit that controls the reset switch;

the reverse grounding detection and execution circuit comprises a reverse connection detection control circuit and a detection and execution circuit, which are connected to each other and carry out detecting of a reverse connection of the ground fault protection circuit in a reset state and in a tripped state;

the wireless network circuit carries out sending and receiving of wireless signals of the power supply grounding fault protection circuit and is respectively connected to the power supply circuit and the microcontroller control circuit; and the automatic resetting circuit is connected to the microcontroller control circuit and carries out controlling and driving of resetting actions of the reset switch of the tripping mechanism control circuit.

10. The power supply grounding fault protection circuit of claim 9, wherein:
the power supply circuit comprises a power supply filter circuit, a first rectifier circuit, a first filter and regulator circuit, and a second filter and regulator circuit;
the first filter and regulator circuit is connected to the leakage grounding detection circuit;
the second filter and regulator circuit is connected to the signal amplifying and shaping circuit and the microcontroller control circuit;
the leakage grounding detection circuit, the signal amplifying and shaping circuit, and the microcontroller control circuit are connected in sequence; and
the microcontroller control circuit is connected to the power supply detection and indicator circuit, the tripping mechanism control circuit, and the reverse connection detection and execution circuit.

11. The power supply grounding fault protection circuit of claim 10, wherein:
the power supply filter circuit is connected to an input terminal of the live line;
a first input terminal and a second input terminal of the first rectifier circuit are respectively connected to an input terminal of the neutral line and an output terminal of the power supply filter circuit;
a first pin of the first rectifier circuit is grounded;
a second pin of the first rectifier circuit is connected to the both the first filter and regulator circuit and the second filter and regulator circuit; and
the reset switch is positioned on the live line and the neutral line after the grounding detection circuit.

12. The power supply grounding fault protection circuit of claim 9, further comprising a simulation leakage circuit connected to the microcontroller control circuit and the leakage grounding detection circuit.

13. The power supply grounding fault protection circuit of claim 8, further comprising a simulation leakage circuit connected to the microcontroller control circuit and the leakage grounding detection circuit.

14. The power supply grounding fault protection circuit of claim 8, wherein:
the automatic resetting circuit comprises an automatic resetting iron core, a surge absorption filter capacitor, a surge absorption resistor, and an automatic resetting driving circuit;
the automatic resetting driving circuit comprises a silicon controlled rectifier and a driving resistor;
a first terminal of the automatic resetting iron core is connected to an input terminal of a live line of the power supply grounding fault protection circuit;
a second terminal of the automatic resetting iron core is connected to a first pin of the silicon controlled rectifier through the surge absorption filter capacitor and the surge adsorption resistor, which are connected in series;
a second pin of the silicon controlled rectifier is connected to the automatic resetting iron core;
the first pin of the silicon controlled rectifier five is grounded;
the driving resistor is connected to a fifth pin of a microcontroller of the microcontroller control circuit and a third pin of the silicon controlled rectifier;
the fifth pin of the microcontroller is grounded via a filter capacitor; and
the microcontroller control circuit is configured to carry out automatic resetting by receiving wireless control signals through the wireless network circuit and by controlling the resetting iron core through the automatic resetting circuit.

15. A power supply grounding fault protection circuit, comprising:
a power supply circuit;
a leakage grounding detection circuit;
a signal amplifying and shaping circuit;
a microcontroller control circuit;
a power supply detection and indicator circuit;
a tripping mechanism control circuit;
a reverse grounding detection and execution circuit;
a wireless network circuit; and
an automatic resetting circuit, wherein:
the automatic resetting circuit comprises an automatic resetting iron core, a surge absorption filter capacitor, a surge absorption resistor, and an automatic resetting driving circuit;
the automatic resetting driving circuit comprises a silicon controlled rectifier and a driving resistor;
a first terminal of the automatic resetting iron core is connected to an input terminal of a live line of the power supply grounding fault protection circuit;
a second terminal of the automatic resetting iron core is connected to a first pin of the silicon controlled rectifier through the surge absorption filter capacitor and the surge adsorption resistor, which are connected in series;
a second pin of the silicon controlled rectifier is connected to the automatic resetting iron core;
the first pin of the silicon controlled rectifier five is grounded;
the driving resistor is connected to a fifth pin of a microcontroller of the microcontroller control circuit and a third pin of the silicon controlled rectifier;

the fifth pin of the microcontroller is grounded via a filter capacitor; and the microcontroller control circuit is configured to carry out automatic resetting by receiving wireless control signals through the wireless network circuit and by controlling the resetting iron core through the automatic resetting circuit.

16. The power supply grounding fault protection circuit of claim 15, wherein:

the leakage grounding detection circuit comprises a leakage detection circuit and a grounding detection circuit, which detect leakage failure and grounding failure, respectively;

the signal amplifying and shaping circuit comprises a leakage detection signal amplifying circuit and a signal shaping circuit, which are connected to each other and carry out amplifying and shaping on a leakage detection signal;

the microcontroller control circuit carries out power-on self-test and reset for the power supply grounding fault protection circuit;

the power supply detection and indicator circuit comprises a power supply detection circuit and an indicator circuit, which are connected to each other and carry out detection and displaying of a power status;

the tripping mechanism control circuit comprises a reset switch, which is provided on a live line and a neutral line of the ground fault protection circuit, and a control circuit that controls the reset switch;

the reverse grounding detection and execution circuit comprises a reverse connection detection control circuit and a detection and execution circuit, which are connected to each other and carry out detecting of a reverse connection of the ground fault protection circuit in a reset state and in a tripped state;

the wireless network circuit carries out sending and receiving of wireless signals of the power supply grounding fault protection circuit and is respectively connected to the power supply circuit and the microcontroller control circuit; and the automatic resetting circuit is connected to the microcontroller control circuit and carries out controlling and driving of resetting actions of the reset switch of the tripping mechanism control circuit.

17. The power supply grounding fault protection circuit of claim 16, wherein:

the power supply circuit comprises a power supply filter circuit, a first rectifier circuit, a first filter and regulator circuit, and a second filter and regulator circuit;

the first filter and regulator circuit is connected to the leakage grounding detection circuit;

the second filter and regulator circuit is connected to the signal amplifying and shaping circuit and the microcontroller control circuit;

the leakage grounding detection circuit, the signal amplifying and shaping circuit, and the microcontroller control circuit are connected in sequence; and the microcontroller control circuit is connected to the power supply detection and indicator circuit, the tripping mechanism control circuit, and the reverse connection detection and execution circuit.

18. The power supply grounding fault protection circuit of claim 17, wherein:

the power supply filter circuit is connected to an input terminal of the live line;

a first input terminal and a second input terminal of the first rectifier circuit are respectively connected to an input terminal of the neutral line and an output terminal of the power supply filter circuit;

a first pin of the first rectifier circuit is grounded;

a second pin of the first rectifier circuit is connected to the both the first filter and regulator circuit and the second filter and regulator circuit; and the reset switch is positioned on the live line and the neutral line after the grounding detection circuit.

19. The power supply grounding fault protection circuit of claim 16, further comprising a simulation leakage circuit connected to the microcontroller control circuit and the leakage grounding detection circuit.

20. The power supply grounding fault protection circuit of claim 15, further comprising a simulation leakage circuit connected to the microcontroller control circuit and the leakage grounding detection circuit.

* * * * *